(12) United States Patent
Dix et al.

(10) Patent No.: US 7,591,226 B2
(45) Date of Patent: Sep. 22, 2009

(54) AUTOMATIC PATH GENERATION FOR TRAMLINES

(75) Inventors: Peter J. Dix, Naperville, IL (US); David Rounds, Western Springs, IL (US)

(73) Assignee: CNH America LLC, New Holland, PA (US)

( * ) Notice: Subject to any disclaimer, the term of this patent is extended or adjusted under 35 U.S.C. 154(b) by 297 days.

(21) Appl. No.: 11/592,569

(22) Filed: Nov. 3, 2006

(65) Prior Publication Data

US 2008/0105177 A1    May 8, 2008

(51) Int. Cl.
*A01C 15/00*    (2006.01)
*G06F 7/70*    (2006.01)
*G06F 19/00*    (2006.01)
*G06G 7/00*    (2006.01)
*G06G 7/76*    (2006.01)

(52) U.S. Cl. ........................................ 111/200; 701/50
(58) Field of Classification Search ................. 111/200; 701/50
See application file for complete search history.

(56) References Cited

U.S. PATENT DOCUMENTS

| | | | |
|---|---|---|---|
| 5,790,428 A | 8/1998 | Easton et al. | 364/561 |
| 5,870,689 A | 2/1999 | Hale | 702/5 |
| 5,878,371 A | 3/1999 | Hale et al. | 702/5 |
| 5,902,343 A | 5/1999 | Hale et al. | 701/50 |
| 5,938,709 A | 8/1999 | Hale et al. | 701/50 |
| 5,978,723 A | 11/1999 | Hale et al. | 701/50 |
| 5,987,383 A | 11/1999 | Keller et al. | 701/213 |
| 5,991,694 A | 11/1999 | Gudat et al. | 702/2 |
| 5,995,902 A | 11/1999 | Monson | 701/202 |
| 6,008,756 A | 12/1999 | Boerhave et al. | 342/357 |
| 6,199,000 B1 | 3/2001 | Keller et al. | 701/50 |
| 6,216,614 B1 | 4/2001 | Wollenhaupt | 111/118 |
| 6,363,321 B1 | 3/2002 | Fowler et al. | 701/208 |
| 6,463,374 B1 | 10/2002 | Keller et al. | 701/50 |
| 6,553,299 B1 | 4/2003 | Keller et al. | 701/50 |
| 6,907,336 B2 | 6/2005 | Gray et al. | 701/50 |
| 2002/0072851 A1 | 6/2002 | Ahearn et al. | 701/213 |
| 2003/0109975 A1 | 6/2003 | Paice et al. | 701/50 |
| 2003/0187560 A1 | 10/2003 | Keller et al. | 701/50 |
| 2004/0193348 A1 | 9/2004 | Gray et al. | 701/50 |
| 2005/0010379 A1 | 1/2005 | Meiners et al. | 703/1 |
| 2005/0015189 A1 | 1/2005 | Posselius et al. | 701/50 |
| 2005/0027422 A1 | 2/2005 | Paice et al. | 701/50 |

*Primary Examiner*—Christopher J. Novosad
(74) *Attorney, Agent, or Firm*—Patrick M. Sheldrake; John William Stader; Michael G. Harms

(57) ABSTRACT

An apparatus and method for generating and allowing the generation of tramline procedures while planting and/or subsequent agricultural operations is disclosed which benefits from the use of GPS systems.

16 Claims, 3 Drawing Sheets ent invention relates generally to apparatus and
AUTOMATIC PATH GENERATION FOR TRAMLINES

TECHNICAL FIELD

The present invention relates generally to apparatus and methods for generating tramlines, particularly for automatically generating tramlines.

BACKGROUND ART

Tramlines are open tracks intentionally left unseeded in fields of cultivated crops. They have become increasingly more important as markers or guides in the fields, while spraying herbicides or other chemicals, in order to eliminate spray overlaps and skips. With high cost, low dose chemicals, overlaps result in increased chemical cost and potential crop injury, while skips result in untreated areas. Also, tramlines enable spraying under poor lighting conditions and thereby make it possible to take advantage of cool, calm spraying conditions at dusk and/or at nighttime. Spraying at night or early morning is advantageous because less water is needed, as evaporation is less of a problem and dew may be taken advantage of. Further, the stoma openings on the plants' leaves are open, therefore less chemical is needed to provide the desired results. Further, as no seeds are planted in the tramlines, anything growing in the tramlines indicates the presence of weeds or other unwanted plants.

Also, and perhaps more importantly, tramlines are utilized as a pathway for wheels of agricultural implements. Tramlines permit taking multiple trips across a field without creating additional wheel tracks and therefore inhibits what would otherwise be excessive soil compaction over a widespread area. Also, driving on plants results in uneven maturation, which may be detrimental to the ability to readily harvest the crop. Accordingly, tramlines permit multiple trips across a field such as, for example, when top dressing nitrogen late in the season to boost yields and to enhance the protein content in a good year, or when applying fungicides and growth regulators, and the like, all without creating additional wheel tracks.

In the past, tramlines were generated by plugging certain dispensing units of planting drills, or by simply not having a dispensing unit installed at various points on the planter, corresponding to the rows where the tramlines were desired. However, the operating equipment was incapable of placing the tramlines in exactly the same location from year to year. Accordingly, prior art tramlining was not effective in preventing soil compaction.

Thus, a need exists to provide an apparatus and method for generating tramlines for the wheels of agricultural vehicles to follow, which would allow wheel tracks to be repeatedly run directly over the same unplanted rows, enabling improved spraying and cultivation.

The transfer of global positioning (GPS) technologies to civilian industry has greatly assisted in meeting financial challenges presented by today's precision agricultural needs. Systems typically achieve meter-level accuracy by utilizing differential GPS (DGPS) position corrections transmitted from fixed base stations through, for example, moving map displays. Such systems allow for navigation and guidance of farm implements and systems using DGPS for applying fertilizers, herbicides and pesticides. However, such systems have generally been limited in their capabilities.

SUMMARY OF THE INVENTION

In accordance with the present invention, pathways for tramlines are generated from data stored in and retrieved from computer processing units which data is based upon predefined planting or seeding patterns on the field. An automatic guidance system tracks a first agricultural vehicle and generates a tramline based upon the driven pathway. Swaths for subsequent vehicles or for subsequent trips by the same vehicle are generated automatically based upon predefined patterns, such as, for example, the width of a spray application booms or the width of an agricultural implement's wheel base. The automatic guidance system can be, if desired, integrated with the planting system such that the automatic guidance system can determine which rows of the planter are to be turned off to produce the tramlines. The system then stores the information, and allows an operator to retrieve it at any time. The tramlines may serve as a guide for the wheels of a subsequent vehicle, such as a sprayer, to be used after planting.

DETAILED DESCRIPTION OF THE INVENTION

Figure 1:
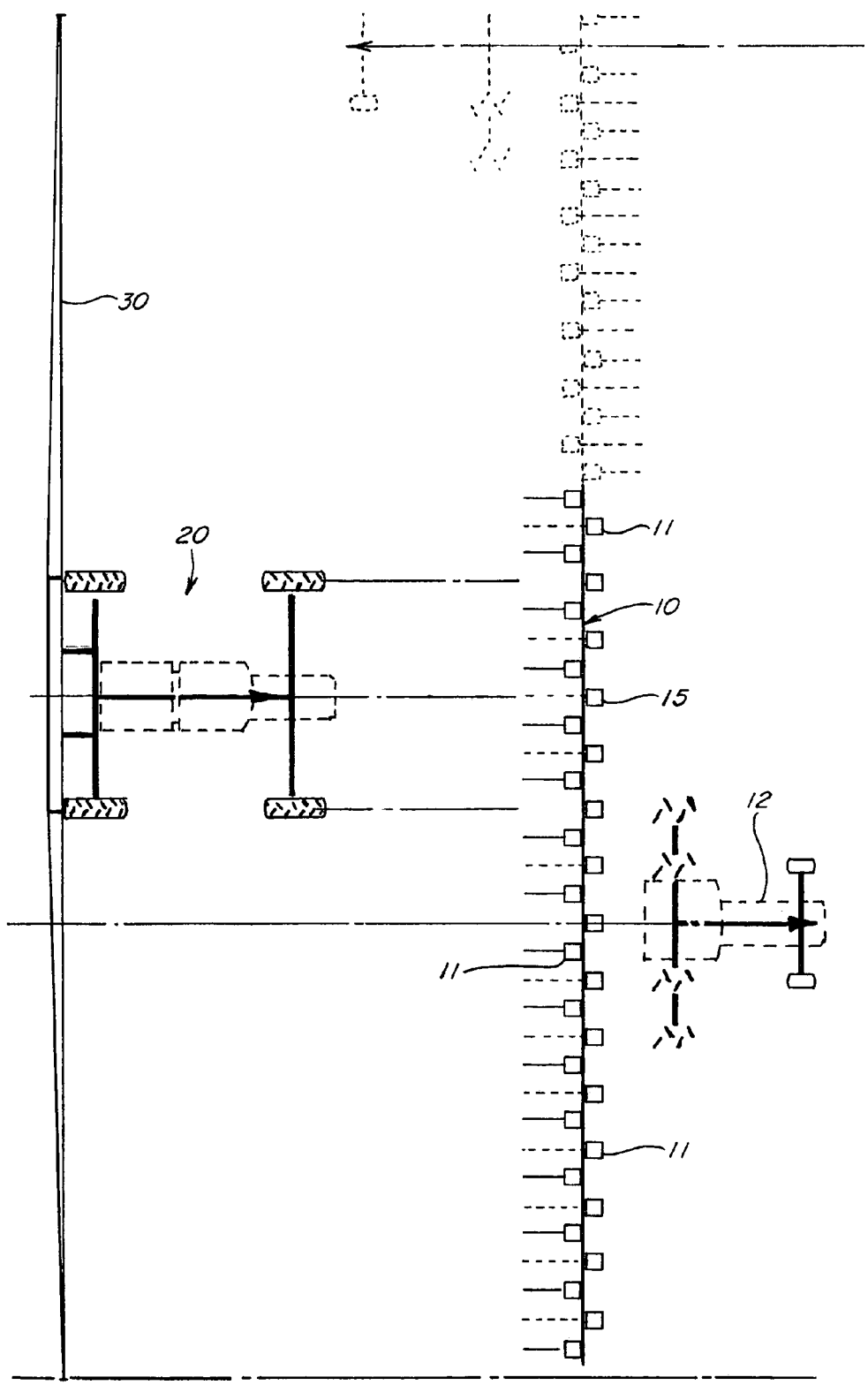
FIG. 1 is a top schematic view of a tractor towed planter, followed by a sprayer with the boom making a swath around a field.

The present invention uses corrected satellite-based positioning systems such as a corrected global positioning system not only as a guidance system for parallel runs up and down a field, but also as an information source to control additional actions. Using a corrected Real Time Kinetic (RTK) GPS that includes a local portable base station, the corrected GPS can locate a tractor to within less than an inch of a desired path. With this capability and the tractor location information transmitted to a computer that records it, the apparatus of the invention can store and can record precisely the tractor's present location and everywhere the tractor has been. It should be noted that the additional actions which are controlled by a corrected GPS operate well with differential global positioning systems (DGPS).

This means that, for the preferred embodiment using a tractor towed planting drill 10, while the first circumferential run around a field is being made around the edges of the field 1, the planter control computer 102 is mapping the exact location of the boundaries of the field 1. Furthermore, with the planting drill 10, dimensions already entered into the computer 102 and sensors 106 on the tractor 12 and the towed planting drill 10, to provide information to the computer 102 on the position, operation mode, and orientation of the drill 10, the computer 102 records the dimensions of the portions of the field 1 that have already been planted. Of course, this also provides the computer 102 with the information needed to determine the exact area and location of the unplanted portion of the field 1 enclosed within that first circumferential cut.

In accordance with this invention, individual dispensing units 15 will be either activated or deactivated in accordance with the dimensions of a predefined or predetermined wheel base, for subsequent spraying or other implements which are either towed or driven in a later run after planting. The GPS system 108 will also operate to record that swath in the computer 102 and the computer 102 will allow displaying the swath image on a monitor displayed in the tractor during the subsequent spraying run.

Afterwards, while in automatic mode, a subsequently driven spray vehicle 20 with boom 30 can make circumferential runs, as well as parallel runs up and down the field 1, until the entire field 1 has been sprayed. The computer 104 automatically steers the vehicle to follow the tramline pathway displayed on the monitor. It should also be noted that a spray vehicle can be employed without GPS and have the tramline function work effectively.

If a planter 10 or subsequent sprayer 20 or other agricultural implement is aligned in its position of travel on the opposite side of a tractor, then a control module allows functional operation of the implement just as it reaches the yet untreated portion of the field. The control module 104 can reset the tractor transmission and bring the tractor back up to a speed appropriate for a long run down the field 1, during which time the control module 104 and GPS 108 can maintain the apparatus in perfect position, relative to the desired tramline, to maintain a minimum overlap.

It is likely that some operator intervention will be required, particularly at the end of the field 1, for directional transitions or to avoid obstacles in the field 1, so the apparatus of the invention does permit the operator to take over steering control and leave the computer 102 in control of other functions, particularly those involving opening or shutting off the planter dispensing units 15 on the planting drill 10 as well as opening or closing the spray hoses on the cultivator or spray boom 30, and lifting and lowering the drill 10 and/or the boom 30, or other agricultural implement.

In one embodiment of the invention, the GPS system sensor controller 100 can be configured to identify a target according to a sensor 106 input and a position input. The apparatus of the invention may be self-propelled, as for example, a self-propelled sprayer as an alternative to being towed by a tractor. In either case, the target is the desired tramline.

In general, the GPS sensor controller 100 includes a sensor package 104/106 configured to detect a characteristic of the tramline (for example, its location, width, depth, or other attribute) and a decision-making apparatus 102 is coupled thereto. The decision-making apparatus 102 or computer processing unit is configured to combine inputs from the sensor package, the precise positioning apparatus 108, and a digital map of an operating area such as the field 1 in which the vehicle operates to produce a decision output. An actuator (not shown) within the vehicle is configured to respond to the decision output of the decision-making apparatus.

With reference to FIG. 1, the present invention provides an apparatus and a method for controlling the formation of tramlines and for determining the location of tramlines during agricultural production. The apparatus includes a GPS 100 having a component 102 partially located on a planting machine 10 (or planting drill) and a component 104 substantially located on a subsequently driven agricultural machine 20 such as a tractor and/or spray boom 30, or other agricultural implement.

The planting or seedling machine 10 is adapted to plant seeds from individual dispensers 15 in a predetermined pattern. That predetermined pattern creates the tramline.

Figure 2:
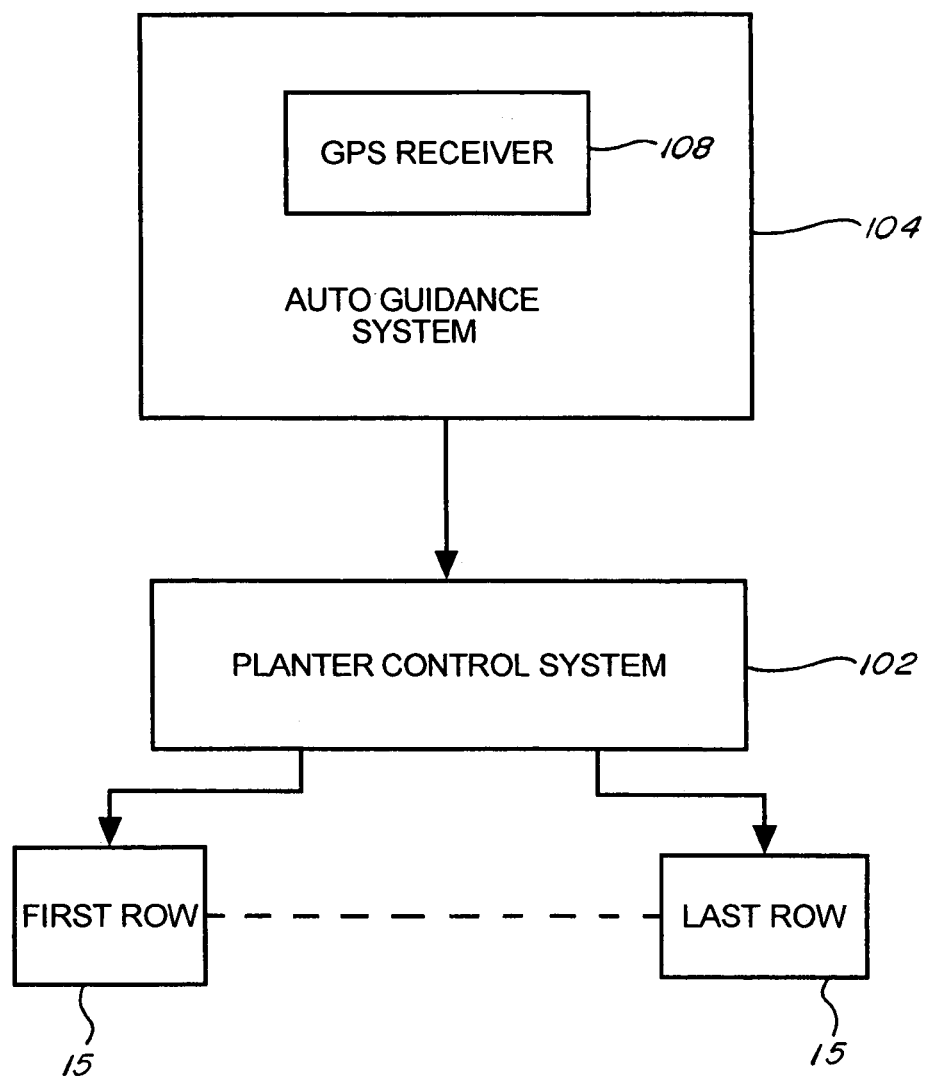
FIG. 2 is a flow diagram of the automatic tramline device of the present invention.

A device 106, such as a sensor, or control mechanisms for opening the planter units also senses whether seeds are going into the ground, is generally located on the planting machine 10, senses the dispensers 15. It senses whether the individual dispensers are open or closed during a planting operation and responsively produces position information signals. In the preferred embodiment, the planting machine position sensing device 106 communicates with a global positioning satellite (GPS) system 100, illustrated in FIG. 2 which receives signals from a number of GPS satellites (not shown) and determines the desired position using triangulation. In the preferred embodiment, its positioning includes a northing and easting location and elevation. Also, the device 106 for sensing the position of the planting machine 102 may communicate with instruments for determining the orientation of the machine 10, such as tilt, pitch, and yaw sensors (not shown).

Figure 3:
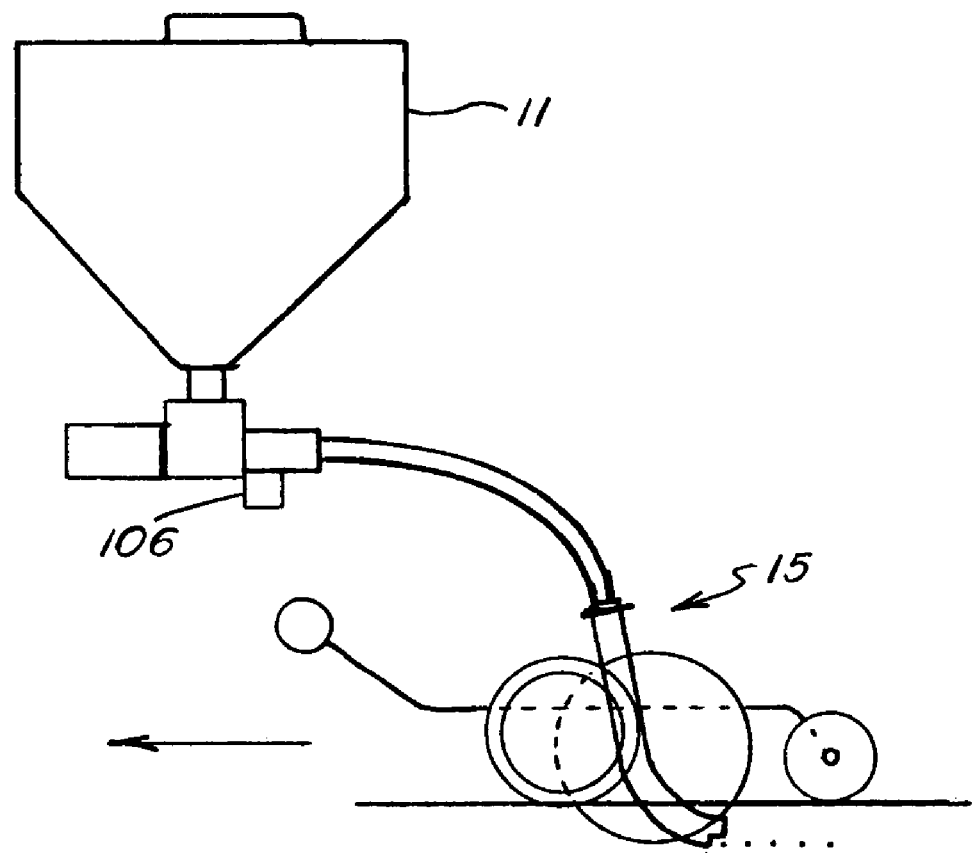
FIG. 3 is an expanded side view of the side hopper portion of a planter showing the hose where seed is delivered to the planter.

Referring to FIG. 3, sensor 106 can trigger flow of seed from chopper 11 to a designated planting unit 15.

A receiver 108, located in the component 104, receives the position information signals, responsively transforms the position information signals to seed row locations and responsively constructs a database of the seed locations.

In one embodiment, the agricultural machine 20 is operated autonomously. The stored location of the rows of either seeds or seedlings may be used to guide a subsequent spray boom 30. The machine guidance system via receiver 104 receives the individual locations of the rows of seeds or seedlings, and determines a path through the rows that will not damage the seeds or seedlings, which rows define the tramline. In addition, the stored location of rows of seeds or seedlings may be used by the machine guidance system to position, for example, a spray boom 30 to avoid compacting the soil where seeds or seedlings are growing while the machine 20 is traversing the field. Based upon the speed of the machine 20, its position, its relationship to the seedlings, the row locations may be dynamically determined or modified.

The ability to display the location of seed or seedling rows is important for an on-board operator. In the preferred embodiment, as an operator guides an agricultural implement 20 through a field, the operator may be enabled to see an image of the swath of rows to be sprayed for enhanced safe guidance through the field without damaging the seedlings. For example, the display will provide a visual indication of the relationship between the wheels and the seedling rows or between spray boom nozzles and rows. Therefore, any necessary adjustments in position, may be performed by the operator. This illustrates only one embodiment of the many possible applications of the present invention.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method for planting rows of seeds in an agricultural field in a plurality of swaths including unseeded rows disposed at asymmetrical locations within the swaths which will comprise tramlines for receiving wheels of a vehicle to be subsequently driven through the field, comprising the steps of:

(a) planting the seeds in the rows in the field in a parallel manner using a planting machine having a plurality of seed dispensers at spaced locations along a width of the planting machine;

(b) automatically blocking predetermined ones of the dispensers on the planting machine at the asymmetrical locations for forming the unseeded rows, the predetermined dispensers being selected as a function of the width of the planting machine, a width of the vehicle, and the width between the wheels of the vehicle, such that predetermined adjacent ones of the unseeded rows will be spaced a distance apart about equal to the width between the wheels of the vehicle; and (c) varying the ones of the blocked dispensers along the width of the planting machine during planting of successive swaths of the field.

2. A method as set forth in claim 1, further comprising the steps of:

sensing position information of the planting machine during planting;

recording the asymmetrical locations of the tramlines; and displaying the locations of the tramlines in the planting machine.

3. A method as set forth in claim 2, wherein said displaying step includes displaying landmarks associated with the swaths of the agricultural field.

4. A method as set forth in claim 2, further comprising displaying the locations of the tramlines as a desired path for the subsequent vehicle.

5. The method of claim 1 which includes a GPS system.

6. The method of claim 1 without employing a GPS system.

7. A method for automatically generating tramlines of unseeded rows of a field to be driven by a first work vehicle associated with a planting implement having a first width and including uniformly spaced, individually controllable seed dispensing units along the width, the tramlines to be subsequently driven by a second work vehicle including an implement having a second width different than the first width, comprising the steps of:

identifying a first swath pattern to be driven by the first work vehicle, the first swath pattern including a plurality of swaths and swath lines spaced at a distance related to the spacing of the dispensing units of the planting implement;

identifying a second swath pattern including a plurality of swaths to be subsequently driven by the second work vehicle;

determining a lateral distance between an end of the implement and a wheel of the second work vehicle as a function of a wheel base of the second work vehicle and the second width;

determining a first wheel line and a second wheel line in each swath of the second swath pattern as a function of the lateral distance between the end of the implement and the wheel;

comparing the first and second swath patterns and identifying each swath line of the first swath pattern most closely corresponding to the first and second wheel lines of the second swath pattern, the identified swath lines being asymmetrical with respect to a center line of the first work vehicle, such that the first and second wheel lines of a particular swath of the second swath pattern may correspond to swath lines on adjacent swaths of the first swath pattern; and disabling individual dispensing units of the planting implement for each identified swath line resulting in asymmetrically disabling individual dispensing units with respect to the planting implement to create the tramlines when driving the first work vehicle over the field.

8. A method as set forth in claim 7, further comprising the steps of storing the first swath pattern including the tramlines of unseeded rows and displaying the tramlines during planting.

9. A method as set forth in claim 8, further comprising the steps of displaying the tramlines in the second work vehicle as desired wheel lines for the wheels of the second work vehicle.

10. The method of claim 7 wherein the first and second work vehicles are controlled by an auto guidance system.

11. The method of claim 7 wherein a GPS system provides position information for generating the tramlines.

12. A method for planting a field using a planting implement having a first extent, while automatically generating tramlines of unseeded rows for accommodating wheels of a work vehicle to be subsequently driven over the field, the vehicle including a second implement with a second lateral extent different from the first lateral extent, comprising the steps of:

identifying a swath pattern including swath lines, spaced at a distance related to uniformly spaced, individually controllable dispensing units of the planting implement;

determining a first distance between an end of the second implement and a wheel of the work vehicle, and a second distance between the wheel and a second wheel of the work vehicle as a function of a wheel base of the work vehicle and the second lateral extent;

converting the first and second distances to first and second numbers of rows of the swath pattern, respectively, as a function of the spacing of the swath lines;

defining an asymmetric pattern of swath lines relative to a center line of the planting implement corresponding to locations of the wheels of the work vehicle in the swath pattern as a function of the first and second numbers of rows, and disabling individual dispensing units of the planting implement for each swath line corresponding to the locations of the wheels of the work vehicle when planting the field.

13. A method as set forth in claim 12, further comprising the steps of storing the swath pattern including the tramlines of unseeded rows and displaying the tramlines during planting.

14. A method as set forth in claim 13, further comprising the steps of displaying the tramlines in the second work vehicle as desired wheel lines for the wheels of the second work vehicle.

15. The method of claim 12 wherein the planting implement and work vehicles are controlled by an auto guidance system.

16. The method of claim 12 wherein a GPS system provides position information for generating the tramlines.

* * * * *